United States Patent
Sharma et al.

(10) Patent No.: US 10,558,979 B2
(45) Date of Patent: Feb. 11, 2020

(54) METHOD OF, AND SYSTEM FOR, PREVENTING UNAUTHORIZED PRODUCTS FROM BEING SOLD ON ONLINE SITES

(71) Applicant: Zortag, Inc., Great Neck, NY (US)

(72) Inventors: Satya Prakash Sharma, East Setauket, NY (US); Joseph Marino, Port Jefferson Station, NY (US)

(73) Assignee: Zortag, Inc., Great Neck, NY (US)

( * ) Notice: Subject to any disclaimer, the term of this patent is extended or adjusted under 35 U.S.C. 154(b) by 401 days.

(21) Appl. No.: 15/001,278

(22) Filed: Jan. 20, 2016

(65) Prior Publication Data
US 2017/0206574 A1   Jul. 20, 2017

(51) Int. Cl.
*G06Q 20/40* (2012.01)
*G06Q 30/06* (2012.01)
*G06Q 30/00* (2012.01)
*G06Q 20/12* (2012.01)

(52) U.S. Cl.
CPC ....... *G06Q 20/4016* (2013.01); *G06Q 20/123* (2013.01); *G06Q 30/0185* (2013.01); *G06Q 30/0609* (2013.01); *G06Q 30/0643* (2013.01)

(58) Field of Classification Search
CPC combination set(s) only.
See application file for complete search history.

(56) References Cited

U.S. PATENT DOCUMENTS

| | | | |
|---|---|---|---|
| 8,356,333 B2 * | 1/2013 | Kramer | G06F 21/6218 726/2 |
| 8,712,873 B2 | 4/2014 | Sharma | |
| 8,714,442 B2 | 5/2014 | Sharma | |
| 9,082,062 B2 | 7/2015 | Sharma | |
| 9,092,646 B2 * | 7/2015 | Grab | G06F 21/10 |
| 2009/0006860 A1 | 1/2009 | Ross | |
| 2010/0031022 A1 * | 2/2010 | Kramer | G06F 21/6218 713/155 |
| 2010/0241528 A1 | 9/2010 | Hedges | |
| 2013/0007443 A1 * | 1/2013 | Grab | G06F 21/10 713/156 |

(Continued)

OTHER PUBLICATIONS

International Search Report in corresponding international application No. PCT/US16/56737, dated Jan. 26, 2017.

(Continued)

*Primary Examiner* — Zeshan Qayyum
*Assistant Examiner* — Yingying Zhou
(74) *Attorney, Agent, or Firm* — Kirschstein, Israel, Schiffmiller & Pieroni, P.C.

(57) ABSTRACT

Unauthorized products are prevented from being sold on online websites. Product identifier keys and private authentication keys are stored in a database of an authentication server. Each identifier key serves as an address for its corresponding authentication key in the database. A product and a security seal are displayed on a webpage served by a website. An identifier key and an authentication key for the displayed product are encoded into the security seal. In response to selecting the security seal, the website extracts the encoded identifier key and authentication keys, and sends them to the database. The authentication server determines whether the displayed product is genuine and authorized when a match is made between the extracted keys and the stored keys.

4 Claims, 11 Drawing Sheets

(56) References Cited

U.S. PATENT DOCUMENTS

| | | | |
|---|---|---|---|
| 2013/0173383 A1* | 7/2013 | Sharma | G06Q 30/0201 |
| | | | 705/14.47 |
| 2014/0025542 A1* | 1/2014 | Sharma | G06Q 10/08 |
| | | | 705/28 |
| 2015/0278487 A1 | 10/2015 | Scott | |

OTHER PUBLICATIONS

International Patentability Report in corresponding international application No. PCT/US16/56737, dated Aug. 2, 2018.

* cited by examiner

METHOD OF, AND SYSTEM FOR, PREVENTING UNAUTHORIZED PRODUCTS FROM BEING SOLD ON ONLINE SITES

BACKGROUND OF THE INVENTION

The present disclosure relates generally to a method of, and a system for, preventing unauthorized products from being sold on online sites.

Anti-counterfeiting is a worldwide industry impacting all transactions involving products and/or services. Consumers normally find it difficult to distinguish between authentic and fake transactions. The reason that counterfeiting continues unabated is that there is no easy way to distinguish a genuine transaction from a counterfeit transaction.

Distinguishing genuine transactions from counterfeit transactions are even more difficult for products and/or services bought from online shopping sites. Online shopping allows consumers to purchase products and/or services directly from a seller over the internet. An online store or virtual store provides the convenience of buying products and/or services anytime in privacy, without facing any crowds in retail stores while also allowing price comparisons. This process is called business-to-consumer (B2C) online shopping. Similarly, when a business buys from another business, it is called business-to-business (B2B) online shopping.

It is estimated that more than 85% of the world's online population has used the internet to make a purchase. This is about $75 million people, up 40% in the last two years. However, assuring the authenticity of the transactions bought through internet sites is a daunting challenge.

Typically, an online store only provides pictures, text, multimedia files, and/or descriptions of products for sale to a consumer when shopping online. Some online stores provide or link to supplemental product information, such as instructions, safety procedures, demonstrations, or manufacturer's specifications. Sometimes, written and video reviews are available from consumers who have purchased similar products in the past from the same internet site. However, these reviews are subjective and based on personal preferences that may not reflect end-user satisfaction once the product has been received by a new consumer. These sites may also feature a long list of "personal testimonials", without sufficient information to verify them.

Dishonest online shopping sites trick the consumer by creating a legitimate-looking site and using effective marketing. The products from these sites may never be shipped, turn out to be fake, be of substandard quality, be stolen, or be unauthorized branded products. Dishonest shopping sites bring a bad name to legitimate online shopping sites. Sometimes, a legitimate site may also be tricked by other supply chain partners into believing that the products being supplied to them for sale on their site are genuine and authorized by the brand owner even when they are not. Given the lack of ability to inspect merchandise before purchase, consumers are at a higher risk of fraud on the part of the merchant than in a physical store. Although the benefits of online shopping are considerable, it can create a difficult situation for ascertaining the authenticity of products bought from online sites.

Consumers typically provide their credit card information to these sites and are left with few options if the product turns out to be counterfeit. Credit and consumer protection laws in many countries hold the credit card company liable to refund their customers' money for products or services purchased with the card that were not delivered. The credit card company then has to absorb the loss. However, if a product was delivered, but turns out to be a fake, then the consumer's options are limited. Returning the product may be difficult, because the online site may have disappeared and/or the return address may not be valid. Internet fraud is not limited to products or products only. It may also include services, such as tickets to sought-after events such as concerts, shows, sports events, etc.

Legitimate companies attempt to provide peace of mind to consumers by deploying various approaches, such as quality seals on the webpage if it has undergone an independent assessment and meet all the requirements of the company issuing the seal. The purpose of these seals is to increase the confidence of the online shoppers. The existence of many different seals, or seals unfamiliar to consumers, may foil this effort to a certain extent. Most large online corporations continue to invent new ways to make fraud more difficult; however, the criminals are constantly responding to these developments with new ways to manipulate the system.

Securing products, packages, and shipments from authorized manufacturing sites of brand managers to online sites, and finally to end customers, is therefore of paramount importance due to counterfeiting and diversion of products in the supply chain. Companies try various methods to assure the integrity of their supply chains. Some of these methods deploy security seals, wax seals, markings of various kinds, trusted and authorized distributors and trusted online sites, cryptographic certificates, mechanical and electronic means, radio frequency identification (RFID)-based solutions, barcode-based systems, and computer-based systems to assure supply chain integrity and security. However, counterfeiters, thieves, product diversion entities, and product overflow companies have also become quite sophisticated in circumventing these security approaches.

Brand owners these days have their products manufactured in different parts of the world. Some of their products are manufactured in their captive locations, some are outsourced or subcontracted to contract manufacturers, and some are produced under a license by third parties. Sometimes, some of these subcontractors produce more than the quantity requested by the brand owners. The additional products produced in this manner are then distributed through unauthorized/illegal channels to online sites, depriving brand owners of their revenue and profit.

Product diversion is another vehicle used by dishonest online sites to acquire unauthorized products to sell on their sites. Product diversion may take place during the distribution of products on a global scale. For example, brand owners may want to increase their sales in untapped countries and emerging economies. The prices they charge in these markets are substantially lower than the prices in their established markets. Some unscrupulous companies who specialize in export diversion buy branded products intended for untapped foreign markets at deep discounted prices. They may then divert these products onto online sites for sale in established markets at a significant profit and, in turn, deprive the brand owner of their revenue and profit. For example, pharmaceutical products intended for a poor country can be diverted onto online sites located in any part of the world and sold in a country where the price may be much higher.

Theft is another problem of importance. Vans and trucks carrying high value goods, such as expensive apparel, alcohols, and accessories are often hijacked. Their contents may then be split and delivered to dishonest online sites without any trace.

Counterfeit products comprise yet another major problem. Counterfeit products may appear at online sites in multiple ways, and it will be difficult for the brand owners to find out where the counterfeit shipments and products are coming from, and how they get to the online sites. Even the honest freight consolidators, central distributors, and regional distributors have no way to know if the shipments and products that they received for further movement within the online supply chain are really authentic.

Finally, when consumers purchase a product from an online site, they cannot physically see the product before buying, and thus have no way to know whether the product that they bought online is authentic or fake. If a consumer bought a product believing the product to be authentic, and then attempts to return the product to the brand owner if not satisfied, and if the brand owner refuses to accept the product, then it causes consumer frustration.

The criminals have now started buying real advertising space and advertising on popular and trusted websites, such as eBay and Google, where large amounts of money are paid for prime placement. If a consumer types a product name in the search bar of a search engine, then the consumer will get a large number of sites displayed selling that product. Clicking the product names on any of these websites all looks legitimate.

The fake sites normally will scrape the brand owner's site and copy all of the available information about the product from that site such as photographs, text, specifications, features, marketing material, and even executive photographs to display on their site. There is no easy way to distinguish between a site selling fake products and another one selling real branded products. Just like consumers, the search engine companies, or auction websites, etc., also have no easy way to distinguish between these sites, and therefore cannot stop them. Even if they stop them when discovered, these sites reappear shortly thereafter in another form. It becomes a never-ending game. Criminals have multiple accounts with which to operate. Sites selling multiple brand products also cannot distinguish between the genuine products and the illegal products displayed on their websites.

The search engine and auction website companies use a combination of manual and automated processes to weed out illegal companies. In 2011, it was reported that approximately 95,000 advertisers for counterfeit goods were shut down. However, these companies morph into another form and reappear. Just because a product is placed at prime placement in a search, and looks real, does not mean that it is. As an example, it is estimated that about 5% of the 4.5 billion prescription medications used in the U.S. are counterfeit and are generally purchased by consumers online. Law enforcement also cannot keep up with the flood of fake sites, because these companies may be located in another country.

The present technologies or approaches are inadequate in preventing counterfeiting, diversion, overruns, or theft, or in preventing illegal products from being sold at online sites. To date, both brand owners and consumers have had very limited success in tracking the authenticity of the products available from online sites in real time.

On an auction website, a consumer normally browses through the listings to buy a product. In order to assure that a product on the listing is genuine, the website may require a seller to sign an agreement that the product for sale has not been acquired through a fraudulent activity and is not counterfeit. Many sellers sign such agreements hoping that they will not be caught or caught too late in the process. Significant effort may be required to conduct an analysis of the products that are put on the auction site to determine whether the listed product is counterfeit or fraudulent. This process is time consuming and prone to error.

U.S. patent publication no. 2010/0241528 A1 discloses anti-counterfeiting measures for an online auction website. In this disclosure, a seller uploads images or photographs of a product to be sold and also enters a unique identifier for the product. A seller may also be requested to add a feature, product attributes, and other information, such as color, size, style, etc. The product's unique identifier may be alphanumeric text, a number, or an image and the associated product attributes and information that a manufacturer may have regarding the type of product. If there is a match, then the product is authentic. If it does not match, it is considered fake. However, the seller may obtain these product features for a similar product by perusal of various websites or the brand owner's website.

Accordingly, there is a critical need to have a method of, and a system for, preventing unauthorized products from being sold on online sites. The need exists for an easy way for consumers to check the authenticity of any product before it is bought on an online site, and also for an easy way for a brand owner and law enforcement agencies to track, trace, and authenticate the article of commerce sold at any online site at any time.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
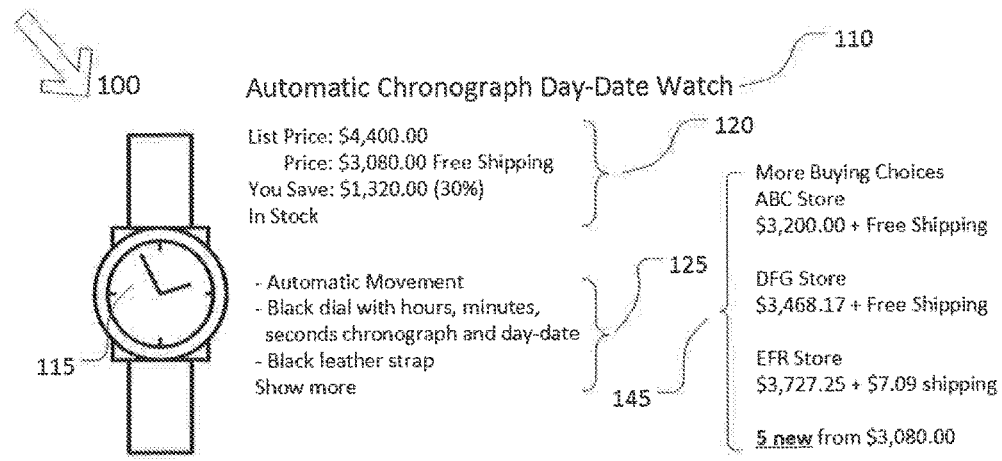
FIG. 1A is a diagrammatic screenshot of a product available for purchase on an online site, together with a secure seal icon and a product registration icon in accordance with this disclosure.
Figure 1A:
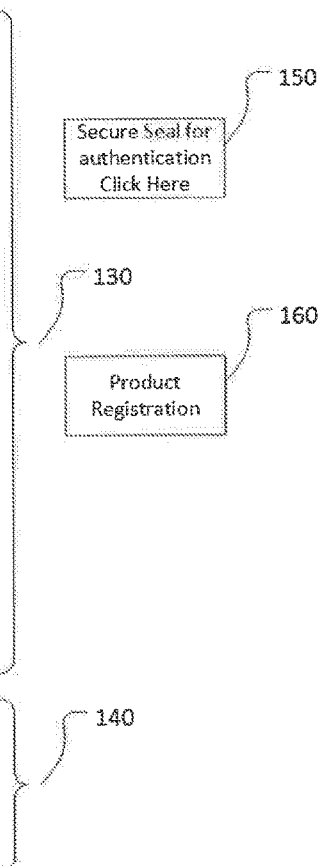

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to a method of preventing unauthorized products from being sold on online websites. The method is performed by storing a plurality of product identifier keys and a corresponding plurality of private authentication keys in an addressable database of an authentication server. Each product has its own product identifier key and its own corresponding private authentication key. Each product identifier key serves as an address for its corresponding private authentication key in the database. The method is further performed by displaying a product to be purchased and a security seal on a webpage served by a website. A product identifier key and a private authentication key for the displayed product are encoded into the security seal. By selecting the security seal, the displayed product is checked to determine if it is genuine and authorized for sale. In response to selecting the security seal, the website extracts the encoded product identifier key and the encoded private authentication key, and sends the extracted product identifier key and the extracted private authentication key to the database. The authentication server matches the extracted product identifier key and the extracted private authentication key with the stored product identifier key and the stored private authentication key, and determines that the displayed product is genuine and authorized when a match is made between the extracted product identifier key and the extracted private authentication key and the stored product identifier key and the stored private authentication key.

Still another aspect of the present disclosure relates to a system for preventing unauthorized products from being sold on online websites. The system includes an authentication server having an addressable database in which a plurality of product identifier keys and a corresponding plurality of private authentication keys are stored. Each product has its own product identifier key and its own corresponding private authentication key. Each product identifier key serves as an address for its corresponding private authentication key in the database. A website displays a product to be purchased and a security seal on a webpage. The security seal is encoded with a product identifier key and a private authentication key for the displayed product. The website extracts the encoded product identifier key and the encoded private authentication key in response to selecting the security seal to check whether the displayed product is genuine and authorized for sale. The website sends the extracted product identifier key and the extracted private authentication key to the database. The authentication server matches the extracted product identifier key and the extracted private authentication key with the stored product identifier key and the stored private authentication key, and also determines that the displayed product is genuine and authorized when a match is made between the extracted product identifier key and the extracted private authentication key and the stored product identifier key and the stored private authentication key.

In accordance with this disclosure, unauthorized products are prevented from being sold on online sites. Consumers can now readily check the authenticity of any product before it is bought on an online site, and even after it is delivered. Also, a brand owner and law enforcement agencies can now readily track, trace, and authenticate an article of commerce sold at any online site at any time.

Turning now to the drawings, diagram 100 in FIG. 1A depicts a screenshot or webpage of a product that is available on a website for purchase. When a buyer connects to such a website that is served by a website server, the name 110 of the product, the pictorial representation 115 of the product, the price 120 of the product, the key features 125 of the product, the specifications 130 of the product, and other choices 145 for buying the same, or a similar, product are displayed. There may be other additional information in the form of text, audio, or video to bring out the distinctive features of the product. All this information is intended to entice a buyer to purchase the displayed product on the website. Since a buyer may not be fully aware of whether or not the website is a reputable site, or if the product that is being offered for sale is genuine, some websites have added a customer review section 140. Buyers who may have previously bought the same, or a similar, product from the same website write their opinions about the product and the website in the review section 140. The new buyer who is browsing the website in search of the product may read these reviews and may be influenced by these reviews to make a decision whether or not to buy. In the absence of available information about the genuineness of the product or the website, the customer review section 140 may be quite important. However, fraudulent websites can also create false customer reviews on their websites and, therefore, these customer reviews are not fully trustworthy. In accordance with the present invention, a genuine website page may also display a secure seal icon 150 and a product registration icon 160.

Figure 1B:
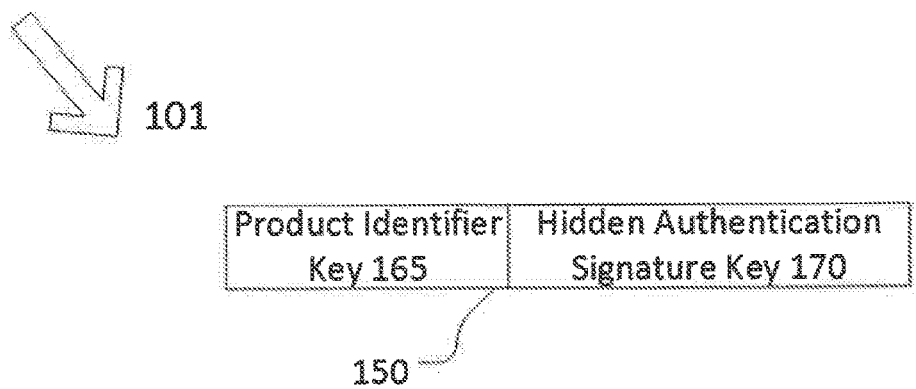
FIG. 1B is a diagrammatic view of a product identifier key and an authentication key that are encoded into the secure seal icon of FIG. 1A.

The secure seal icon 150 consists of two parts as shown by diagram 101 in FIG. 1B. The first part is a unique product identifier key 165, and the second part is an authentication signature key 170. The unique product identifier key 165 could be a combination of the manufacturing code, model number, and serial number, of the product, or an alphanumerical code of some kind. For example, for electronic products, the model, model code, power source, and serial number typically together identify a product. The unique product identifier key 165 could be in the form of a barcode, some other coded alphanumeric structure, or a text, audio, or video file. The authentication signature key 170 consists of extremely difficult to replicate elements.

One example of such difficult to replicate elements that may constitute the authentication signature key 170 was disclosed in U.S. Pat. No. 9,082,062 B2 whose disclosure is hereby incorporated herein by reference thereto. In that disclosure, as shown in the diagram 103 of FIG. 1D, an authentication signature key 170 was configured as a plurality of light-modifying, randomly-distributed, three-dimensional (3D) elements 185A, 185B . . . 185N, such as particles and/or bubbles and/or depressions or like structures that can have any shape, color, material, interior structure (hollow or solid), or size. The 3D elements 185A, 185B . . . 185N of FIG. 1D are preferably of characteristic colors such that they can be visually identified against a selected background contrasting color, and the visual information can be acquired with commodity photography or camera units, such as those found in common mobile phones, industrial imagers, etc. The 3D elements can be comprised of any material. The authentication signature key 170 can be hidden or observable. Advantageously, the authentication signature key 170 is normally hidden from the view of the buyer. The 3D elements 185A, 185B . . . 185N are mounted on an adhesive label 183 that may be physically attached to the product.

The label 183 is attached to a product or article of commerce 186 at the time of manufacture by the brand manager. Preferably, the label 183 is a substrate made, for example, of paper, foil, or film. An adhesive layer 189 on the underside of the label 183 adheres the label 183 to the product 186. The label 183 may be of one-piece or a multi-partite design. The label 183 may also contain anti-tampering qualities, such as the use of a destructible material, the presence of an underlying VOID pattern in case of attempted removal, and the like.

The 3D elements 185A, 185B . . . 185N can occupy different geometrical areas, such as rectangular, triangular, circular, or oval areas, on the label 183. The 3D elements can be mutually spaced apart or can contact one another. The 3D elements can be deposited in a single layer or in multiple layers on the label 183. Although illustrated in FIG. 1D as being partially embedded in a medium 188, the 3D elements can be fully embedded therein, and indeed may be overlaid with a transparent overcoat for protection.

Other hardware-based authentication signature keys may alternatively be employed, such as physically unclonable functions (PUF) that exploit the physical properties of disordered structures, i.e., microstructures characterized by an explicitly-introduced randomness or an intrinsic randomness. Since the microstructures depend on physical factors introduced in manufacturing and are unpredictable, each authentication signature key 170 and security seal icon 150 is different and unpredictable, and this property may be used for authentication.

Alternately, the authentication signature key 170 could be a software-generated alphanumeric code, a large prime number generated by an algorithm, or software-generated structures consisting of numbers, audio, visual, or text-based elements such that any effort required to decipher such a code is time-consuming and very expensive even if such an authentication signature key somehow were divulged to the outside world. Even if such a software-generated authentication signature key becomes known for one product, it will only affect that product because each authentication signature key and each product identifier key is unique hr that product. This approach is important for those companies or entities that want to protect the authenticity of its products, but may not prefer a hardware-based authentication signature key. Alternatively, other software-generated difficult-to-decipher authentication signature keys can also be conceived and generated. These authentication signature keys are also within the scope of the present invention. Advantageously, these authentication signature keys are hidden from the buyer's view.

Figure 1C:
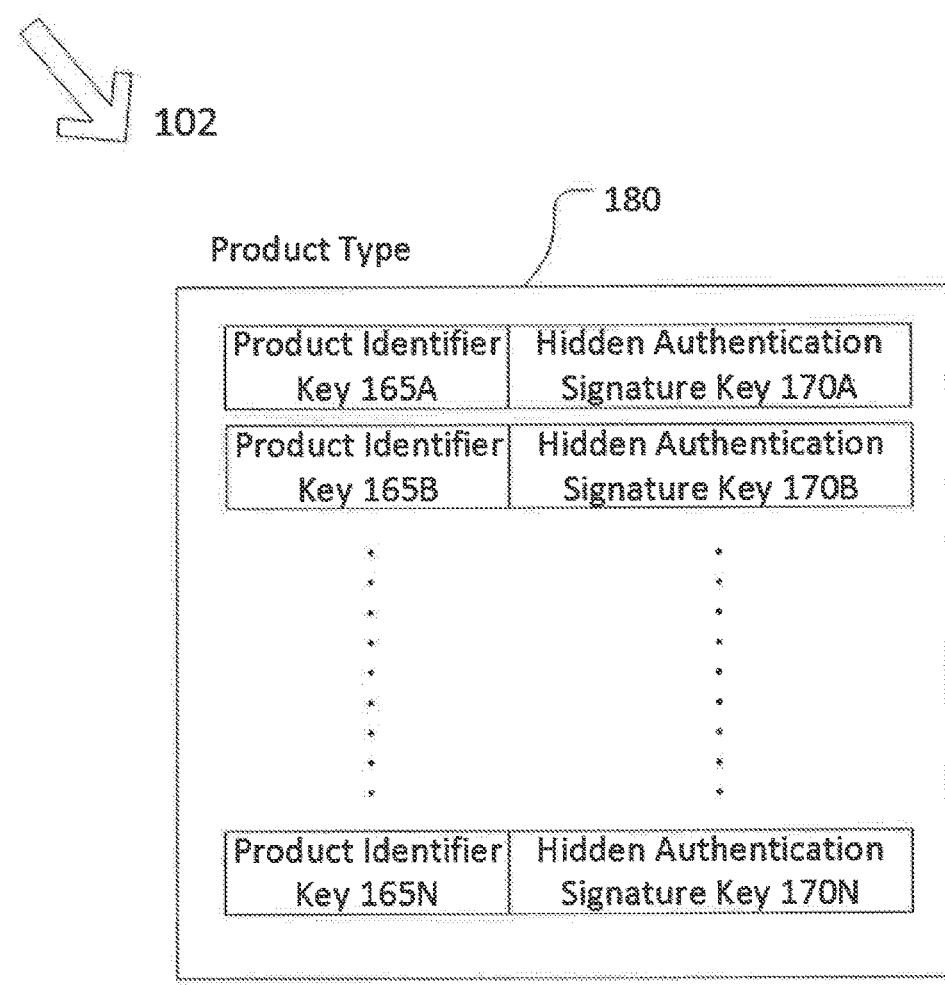
FIG. 1C is a diagrammatic view of a model group of product identifier keys and authentication keys.
Figure 1D:
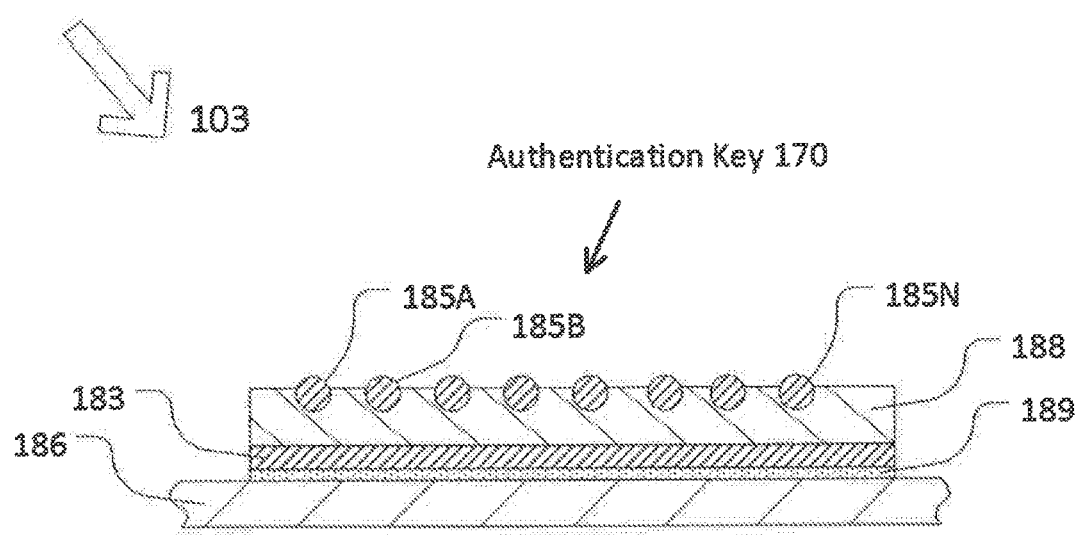
FIG. 1D is a sectional view of a label encoded with the authentication key of the secure seal icon of FIG. 1B.

In another variation of the authentication process, as shown by diagram 102 in FIG. 1C, websites may have several products of similar kind and model listed by their product identifier keys 165A, 165B . . . 165N and by their corresponding authentication signature keys 170A, 170B . . . 170N in a model group 180. Instead of keeping track of each individual product that has been authenticated and assuring that the same product is shipped to the customer from the warehouse, the website may depict all the products in the warehouse that pertain to the model group 180 that the buyer is intending to buy and authenticate all of them as a group. When the buyer clicks on the security seal 150, all product identifier keys of the model group 180 are observable to the buyer and authenticated at the same time as described below. The buyer is then informed that one of the products from the group will be shipped. The buyer can authenticate again when he/she receives the product. This approach may be desirable during the logistics of shipping. If any of the products listed on the website are not authenticated, the website will be informed by an authentication site that a given product with an associated product identifier key is not authentic and should be removed from the website while the remaining products are authentic. Additionally, a brand owner may or may not be informed by the authentication site that one or more than one product depicted on a given site is not authentic depending on the policy of the brand owner.

Figure 2A:
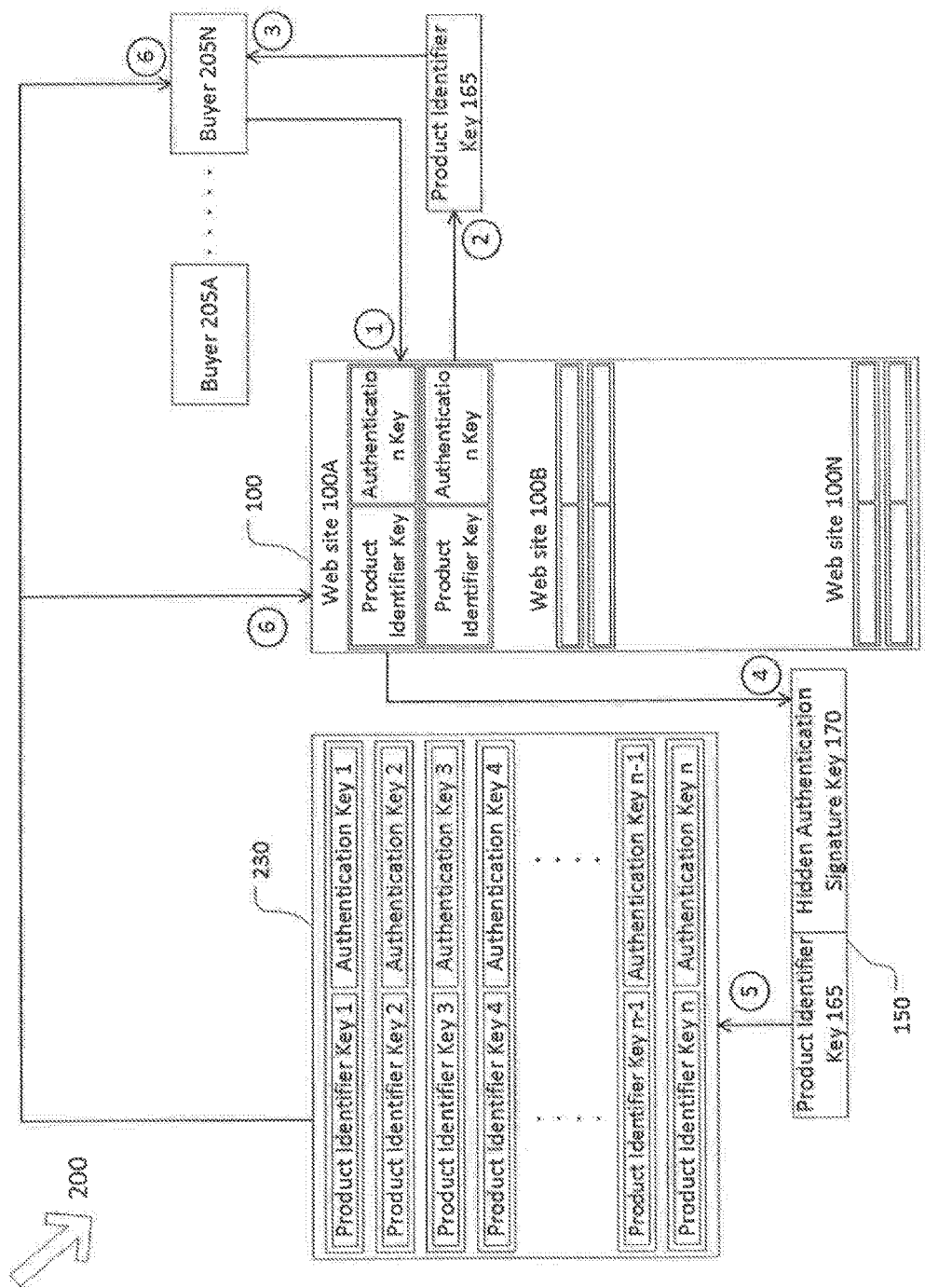
FIG. 2A is a diagrammatic view of a system for preventing unauthorized products from being sold on online sites.

As shown by diagram 200 in FIG. 2A, every product for sale on each website 100A, 100B . . . 100N has one key, which is the product identifier key 165. This key 165 is revealed to a buyer or entity who is interested in buying a product. Each product also has another key, which is the authentication key 170 that is normally hidden from the buyer's view and is only known to a database or an authentication site 230 and/or the brand owner or the entity who wants to securitize their product and prevent fraudulent sale of their products on websites. As shown in FIG. 2A, buyers/consumers 205A . . . 205N connect to the websites 100A, 100B . . . 100N in search of a product to buy as shown by arrow ①. Each website has multiple products displayed on its site. Once the buyers select the product they are interested in buying, they click on the security seal 150 (see FIG. 1A) of the website. The website extracts the product identifier key 165 as shown by arrow ②, and sends this key 165 to the buyer as shown by arrow ③. This is to let the buyer know that the product as identified by the product identifier key 165 is being checked for authenticity. In parallel, the website extracts the product identifier key 165 and the authentication key 170 of the security seal 150 tier the product under consideration as shown by arrow ④, and sends both keys 165, 170, as shown by arrow ⑤, to the database or a remote authentication site 230 through a gateway sever 350 as discussed below in connection with FIG. 3. A brand owner, or the third party authentication site 230, may occasionally check the integrity of the security seal 150 displayed on each website by clicking on the security seal 150 and checking that the security seal 150 always connects to the third party authentication site 230, and not to some other fictitious site to prevent fraud. Software residing on the authentication site 230 may conduct this check/audit automatically or manually. The database of the authentication site 230 has pre-stored a plurality of product identifier keys 1 . . . n and their associated authentication keys 1 . . . n that were affixed or assigned to products under the control and direction of the brand owner. The third party authentication site 230 need not belong to the third party, but can be owned by the brand owner itself. In the remaining description, whenever the term authentication site 230 is mentioned, it should be assumed that it can be an independent third party or the brand owner itself.

The database of the authentication site 230 stores a multitude of other authentication signature keys for other products with their product identifier keys. As described earlier, the first part of the security seal 150 serves as the product identifier key, and also acts as an address identifier that identifies an address for the authentication key in the remote database of the authentication site 230, thereby enabling the database of the authentication site 230 to be interrogated only at that address, rather than having to interrogate every authentication key in the database of the authentication site 230. This greatly accelerates the authentication process embedded in the security seal 150.

In U.S. Pat. No. 8,714,442 B2 whose disclosure is hereby also incorporated herein by reference thereto, the challenges of product overruns, counterfeiting, theft and diversions were addressed by uniquely assigning product identification numbers, configured as RFID tags or barcodes, and combining them with light-modifying, randomly distributed, 3D elements and making it impossible for any unscrupulous character in the supply chain to reproduce an exact label incorporating such authentication media. If any of these products find their way to online websites and do not have the correct label, the encoded information in the security seal 150, which is a surrogate for the label, will be incorrect also.

When a buyer clicks on the security seal 150, if the product identifier key 165 and the associated authentication key 170 encoded in the security seal 150 when compared with the pre-stored unique authentication key 1 . . . n at the memory address corresponding to the product identifier key 1 . . . a does not match, then the response from the security seal 150 to the buyer will be that the product authenticity cannot be confirmed. If the product is confirmed to be genuine, then this information is communicated to the buyer. The confirmation or non-confirmation of the product authenticity to the buyer as displayed on the website is shown by arrow ⑥ in FIG. 2A. In addition, the product can be pre-assigned and pre-registered in the buyer's name with the product identifier key as a confirmed sold product to the buyer. This can happen when the user has paid for the product on the website and has provided his/her address for shipping. This pre-registration happens through the registration icon 160 as shown in FIG. 1A.

Figure 2B:
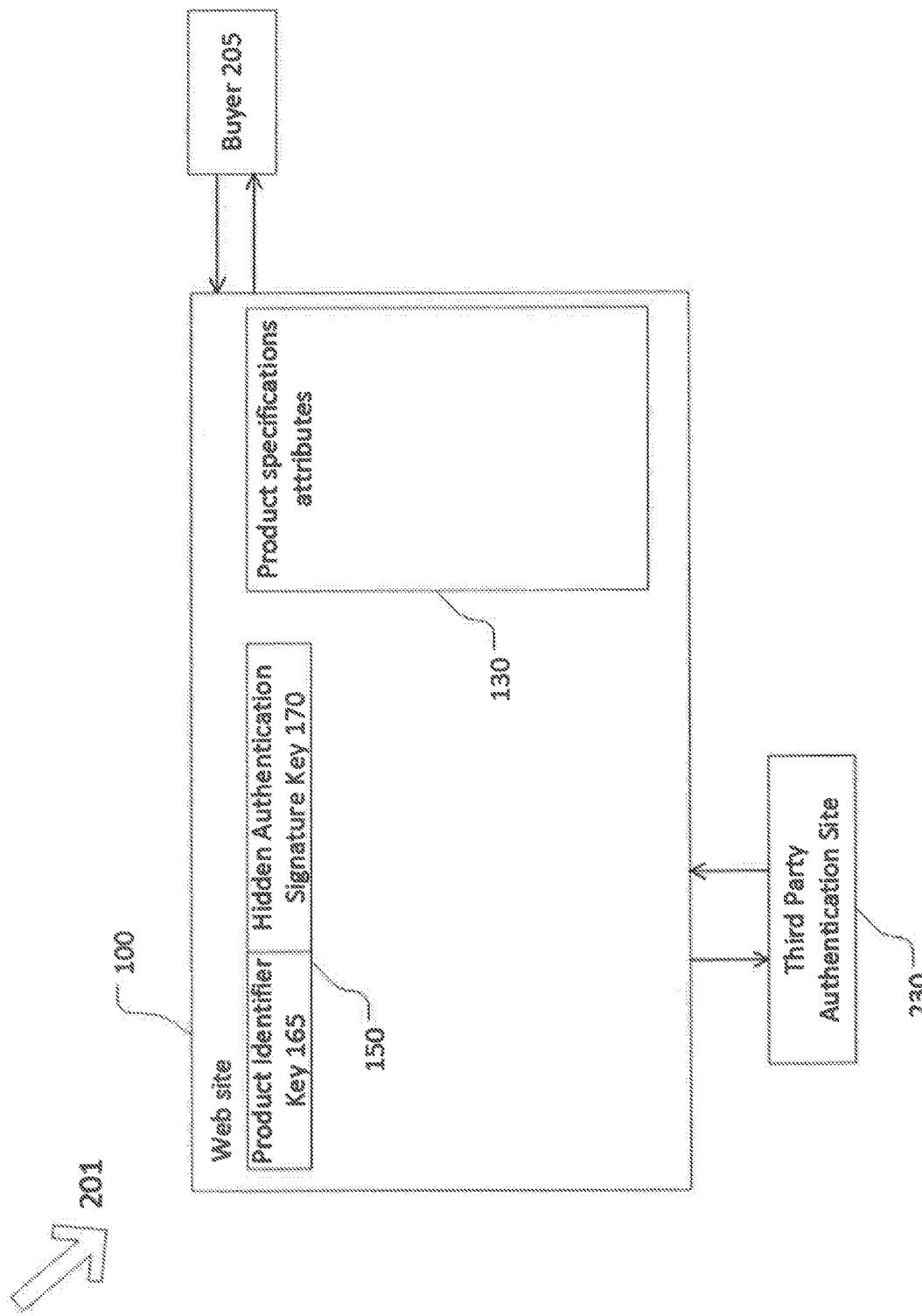
FIG. 2B is a diagrammatic view of a preferred embodiment of the system of FIG. 2A.

As exemplified by the diagram 201 in FIG. 2B, when a buyer 205 contacts a website 100, he/she also notices the product attributes/specifications 130 in the form of textual information, or video/pictorial information, or audio file information describing the salient features of the product.

The authentication site 230 may also request that the buyer or the website 100 provide such descriptive product attributes/specifications 130 related to the product. If the product specifications/attributes 130 as supplied by the buyer or the website 100 are not the same as in the stored information in the database of the authentication website 230, then it can be inferred that the product displayed on the website 100 is fake. For example, it is possible that if the illegal website, or unscrupulous characters trying to sell their products on an auction website, get hold of a genuine product identifier key and the associated genuine authentication key, then they may display it with product attributes/specifications 130 of a different more expensive product of the same brand, or even with another product of a different brand. In the database of the authentication site 230, the brand owner provides attributes under different categories selected by the brand owner for each product, such as color, size, style, etc., and such attributes are stored in the database of the authentication website 230 in addition to the product identifier keys and the associated authentication keys. If the displayed product characteristics/attributes 130 supplied by the buyer, or fetched automatically by the authentication site 230 from the website 100, or through any other means, do not match with the product identifier key 165, the associated authentication key 170, and the product attributes 130 stored in the database of the authentication site 230, then the product displayed on the website is deemed fake.

Figure 3:
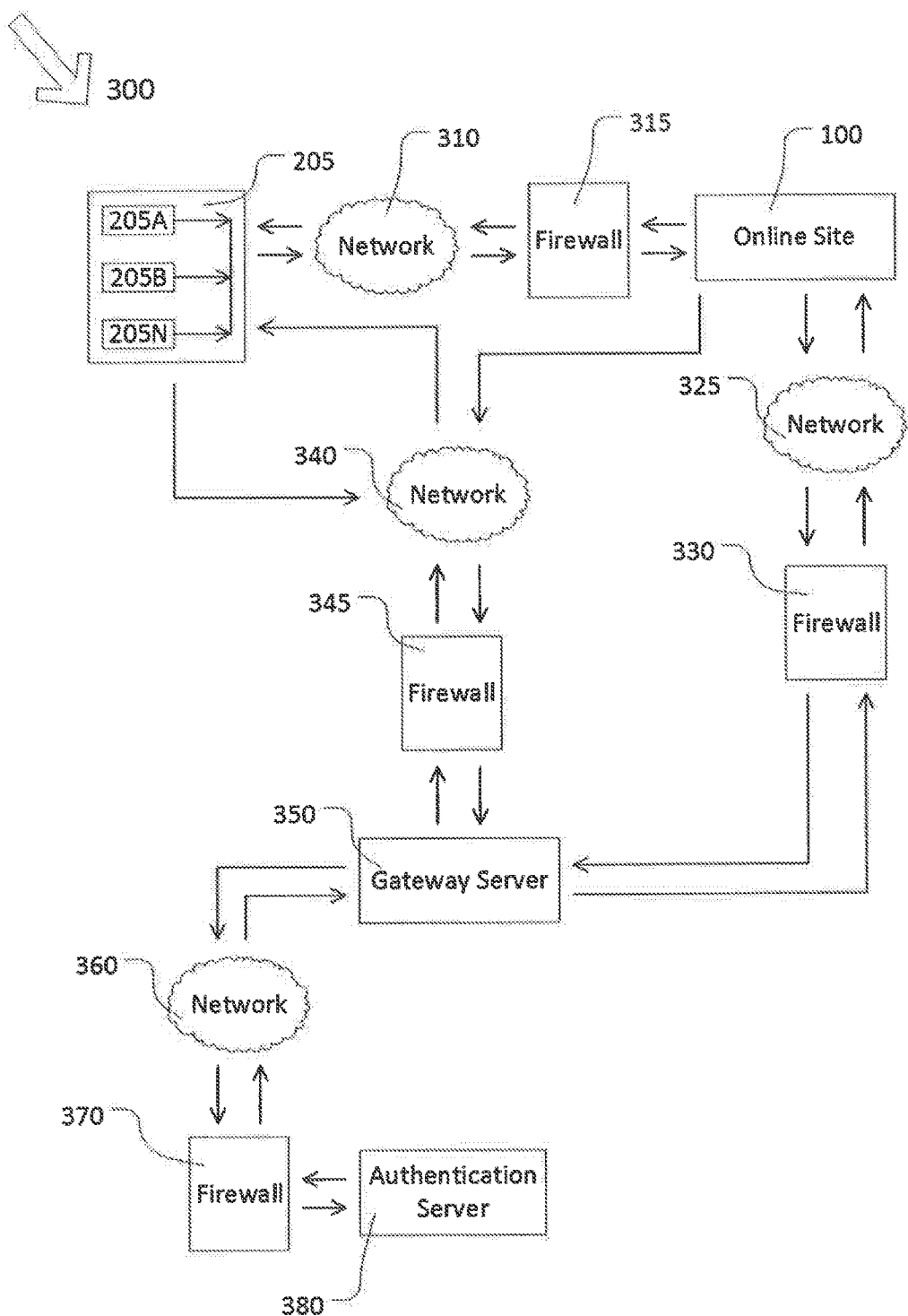
FIG. 3 is a diagrammatic detailed view of a system for preventing unauthorized products from being sold on online sites.

As exemplified by the diagram 300 in FIG. 3, the buyers 205A, 205B, . . . 205N contact online website 100 through a network 310 and a firewall 315 through consumer devices, such as mobile devices, cell phones, desktop computers, notebook computers, netbook computers, or tablets, or any audio, video, or text devices, in order to purchase or browse a product that they may be considering buying. A consumer 205 may find an article/product on the website 100 that has the right features, appropriate price, and the right brand, and may be willing to place an order. At this time, the consumer 205 may click on the security seal icon 150 to check if the product is authentic or not. The security seal icon 150 responds by sending the product identifier key 165 to the buyer, and by informing him/her that the product authenticity of that product is being checked. The authentication key 170 associated with that product identifier key is not advantageously conveyed to the consumer 205. The reason/advantage for not sending the authentication key 170 to the consumer 205 is that some people in the guise of buyers may be interested in knowing the authentication key 170, rather than being interested in actually buying the product. Additionally, some automated computer programs may sniff to find the authentication keys 170 and pass these to dishonest websites. These unscrupulous entities and characters may attempt virtual reality, sophisticated image analysis, 3D visualization schemes, and complex algorithms to beat the system if authentication keys 170 become known to them. Thus, advantageously, all authentication keys 170 are hidden from the outside world. This is to further protect the consumer 205 from dishonest websites 100. However, if the authentication key 170 uses 3D elements and hard-to-break software-generated keys, then even if the authentication key 170 becomes known, it will be impossible for unscrupulous characters to replicate such a key. Besides, any key that becomes known only affects that product. All the other products remain totally unaffected. Additionally, when the product is received by the consumer 205, he/she can again physically authenticate the label containing the 3D elements as described in U.S. Pat. No. 9,082,062 B2 attached to the product 186 to be further reassured.

As mentioned earlier, in addition to sending the product identifier key 165 to the consumer 205, the online website 100 also sends the product identifier key 165 to a gateway sever 350 through a network 340 and a firewall 345. Alternately, the consumer 205 may send the product identifier key 165 to the gateway server 350 for authentication. The gateway server 350 communicates with an authentication server 380 through a network 360 and a firewall 370, and sends the product identifier key 165 to the authentication server 380. On receiving this information, the authentication server 380 first checks to see whether a product with such a product identifier key 165 was ever manufactured by the brand owner, or was manufactured for the brand owner by a third party, and was activated in the database. As discussed in U.S. Pat. No. 9,082,062 B2, a third party may produce more than the requested amount of the product by the brand owner and distribute this product overrun through illegitimate distributor channels including illegal websites. However, if the labels attached to the products were not activated in the database, then such products will not be authorized branded products. Only activated products will be in the authentication database. If the website 100 is displaying a product with the wrong product identifier key 165, then the authentication server 380 will send this information to the gateway server 350, and the gateway server 350 will inform the consumer 205 that the product displayed on the website 100 is not an authorized branded product.

If the product identifier key 165 is found to be activated, then the gateway server 350 will communicate with the online site 100 and request it to send the authentication key 170. The communication between the gateway server 350 and the website 100 proceeds through a network 325 and a firewall 330. The online site 100 then sends the authentication key 170 to the gateway server 350. After receiving the authentication key 170, the gateway server 350 sends both the product identifier key 165 and the authentication key 170 to the authentication server 380. The authentication sever 380 compares the authentication key pre-stored at the memory address (pointer) corresponding to the product identifier key 165 in the database and the authentication key 170 sent by the website 100. If the keys match, then the authentication server 380 informs the gateway server 350 that the product is authentic. The gateway server 350 communicates the authenticity of the product to the consumer 205 and also communicates to the website 100 that the product displayed on the website is authentic. If the product was found to be unauthorized or fake, then that information is also communicated to the consumer 205, the brand owner, and also to the website 100 by the gateway server 350.

Figure 4:
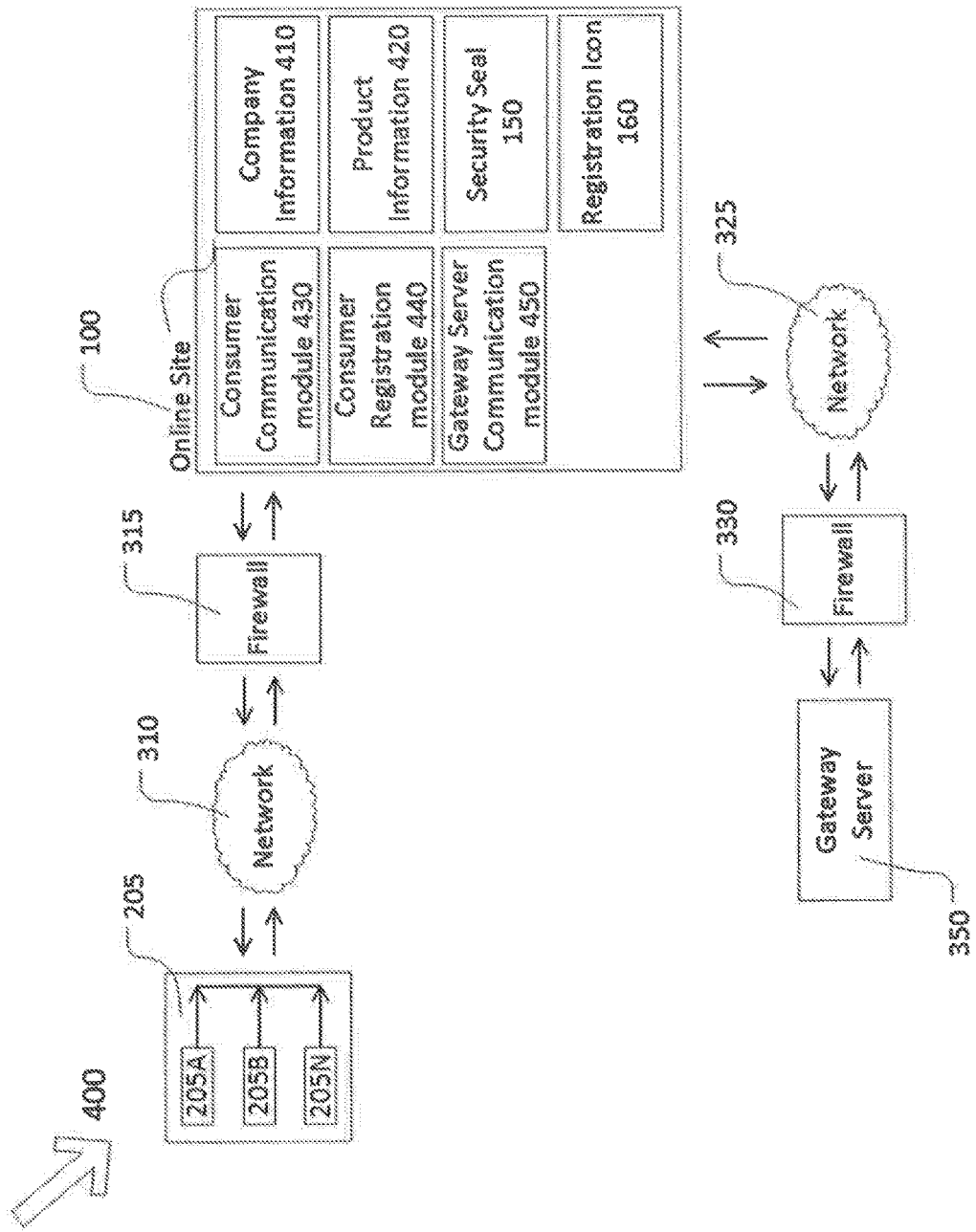
FIG. 4 is a diagrammatic view of a preferred embodiment of the system for preventing unauthorized products from being sold on online sites.

As best shown by diagram 400 in FIG. 4, consumers or entities 205A, 205B, . . . 205N interested in buying a product from a website 100 are in communication with the website 100 and may have a bidirectional link to the website 100 through a network 310 and a firewall 315. Buyers use their devices, e.g., cell phones, PDAs, computers, tablets, etc., to communicate with the website 100. The website 100 may implement hardware and software logic in all its modules to accomplish its intended functions.

A consumer communication module 430 receives a request from the consumer 205 and sends information back to the buyer's device. When the communication module 430 receives a request for information related to a product that a buyer is interested in buying, it transmits that information to the consumer 205 normally through a secure link. When the consumer 205 clicks on the security seal 150 for authentication, then the communication module 430 sends the information to the consumer 205 to let the consumer 205 know that the product authenticity is being checked. The details of the security seal 150 and the registration icon 160 have been discussed earlier in FIGS. 1A-D and 2A-B and are also discussed below in FIG. 5 and are not included here for simplicity. Communication module 430 may check on the IP address, or the device ID and phone number of the devices being used by the buyers to connect to the website 100, when they click on the secure seal icon 150. This information can be transmitted to the communication module 430 of the website 100. Communication module 430 may also check if the consumer 205 is previously registered in the system and, if not previously registered, it may seek a consumer profile that may include the name, email address, consumer's address, and other demographic information, such as income information, shopping habits, hobbies, and family information. A consumer registration module 440 stores this information for the future when the consumer 205 comes back again to buy a product.

The website 100 may also include a gateway server communication module 450 that provides a bidirectional secure communication link to the gateway server 350 through a network 325 and a firewall 330. As mentioned earlier, in addition to sending the product identifier key 165 to the consumer 205, the online website 100 also sends the product identifier key 165 to the gateway sever 350. On receiving this information, the gateway server 350 communicates with the authentication server 380 to check whether an article with such a product identifier key 165 was ever activated by the brand owner, and communicates back to the website 100 its finding through the gateway server communication module 450. Alternatively, the communication module 450 may be merged with the module 430.

If the product identifier key 165 is found to be activated, then the gateway server 350 will communicate with the online site 100 and request it to send the authentication key 170. The online site 100 then sends the authentication key 170 to the gateway server 350. After receiving the authentication key 170, the gateway server 350 sends both the product identifier key 165 and the authentication key 170 to the authentication server 380 to check on the authenticity of the product, and reports its findings back to the website 100 and the brand owner, in addition to the consumer 205. Also included in the website 100 are other standard modules that describe the company information, product information, and other relevant website specific information modules that are part of the present art. These modules are shown as 410 and 420 in FIG. 4.

Figure 5:
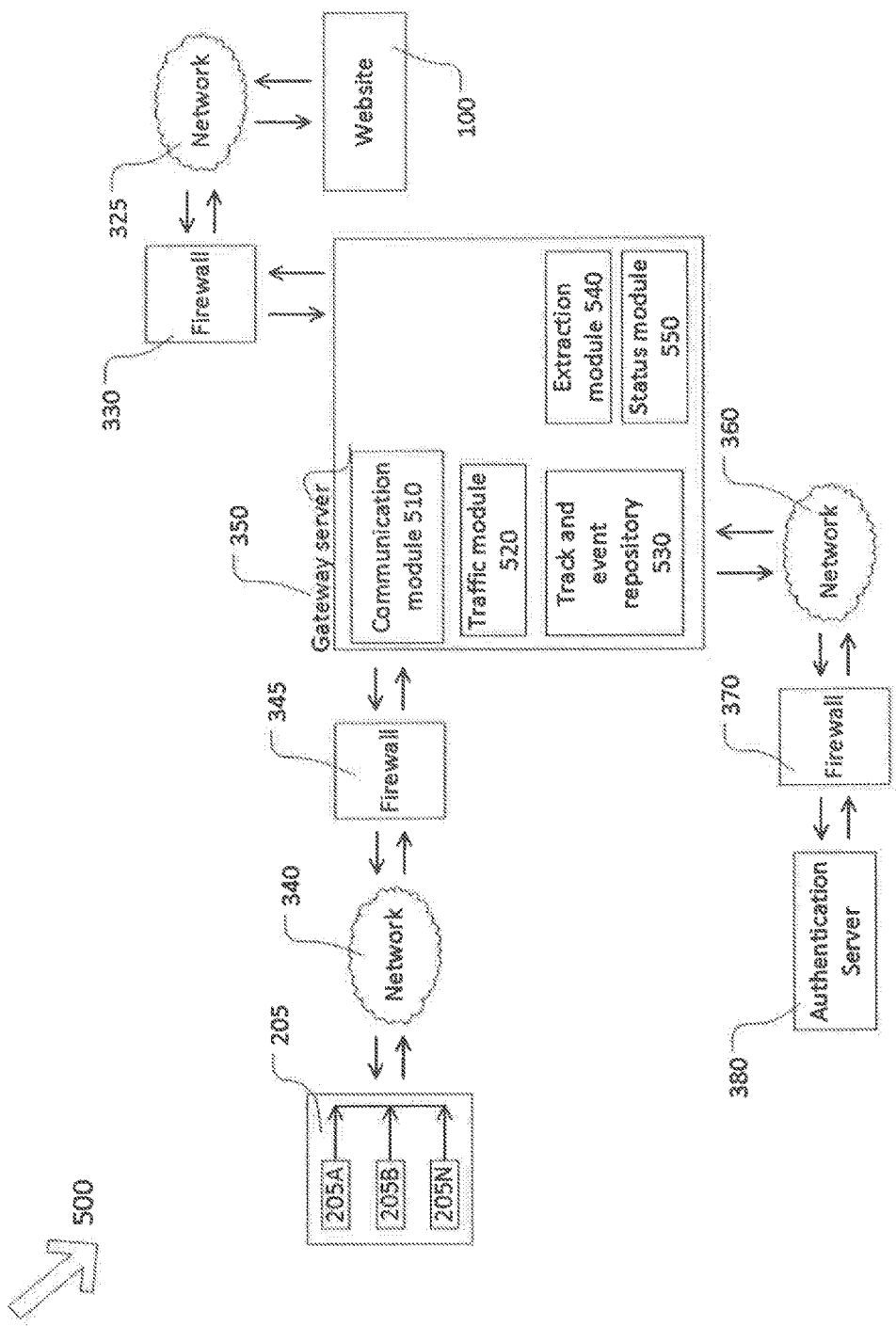
FIG. 5 is a more detailed view of the system of FIG. 2A.

Diagram 500 in FIG. 5 depicts the gateway server 350 that includes the hardware and software programmed to perform certain functions in response to software instructions contained in a computer readable medium. The gateway server 350 interacts with each consumer 205 and the website 100 as described in FIG. 3 and may run such applications as database applications, email applications, communication applications, and e-commerce applications.

The gateway server 350 includes a communication module 510 for interacting with each consumer 205, the website 100, and the authentication server 380. Buyers will click on the secure seal icon 150 displayed on the website 100 to check on the authenticity of the product they intend to buy. If the website 100 displays the secure seal icon 150, this means that the website 100 has agreed to an arrangement with the brand owner whose product is being displayed and the third party who provides the authentication service and the unique product identifier keys 165 and associated authentication signature keys 170, e.g., 3D pattern signatures. Communication module 510 checks if the website 100 subscribes to the authentication secure seal system and service. The gateway server 350 may also seek through its communication module 510 other information, for example, the IP address, the ID or the phone number of the device, or device ID number and user profile information, for example, the user's email address, demographics, location, etc. This information may be useful to track the location and also the person or machine who attempted to authenticate the product and the time such an attempt was made.

As noted above, the information received by the gateway sever 350 may include the authentication key 170 and the unique product identifier key 165. An extraction module 540 in the gateway server 350 separates and distinguishes the authentication key 170 from the identification information, e.g., the brand code, logistic unit/product code, and the serial number. The identification information could be in the form of a barcode or alphanumeric characters. The gateway server 350 also includes a traffic module 520 for directing the captured identification and authentication information to the authentication server 380. When the gateway server 350 receives the authentication key 170 and the product identifier key 165 from the website 100, it transmits this information to the authentication server 380. The product identifier key 165 in the form of a number, or a number encoded in the barcode or radio frequency identification (RFID), or other means, acts as the address for the pre-stored hardware or software based authentication keys in the remote database of the authentication server 380. The pre-stored reference authentication keys or signatures may have been affixed to each product, or were embedded into the product/object or software-generated authentication keys assigned to each product.

While authentication is performed on the authentication server 380, a status module 550 in the gateway server 350 sends the status of the authentication to the device of the consumer 205 and the website 100 through the communication module 510. The number of times a given product was authenticated and the IP addresses and the IDs of the devices from where the authentication request came are captured and kept in an event repository 530. Keeping track of the IP addresses and the number of times the authentication request came for the same article, but from different websites, may signify that the article is not authentic from most sites other than one. An authentic article can only be at one website. Additionally, if the article was meant to be sold at a retail site, but is showing up for sale at a website, or if the article was meant to be sold in a given geographic location, e.g., at a website in the USA, but is showing up for sale at a website from another country, e.g., in China, it could also mean a breach in the brand control.

Figure 6:
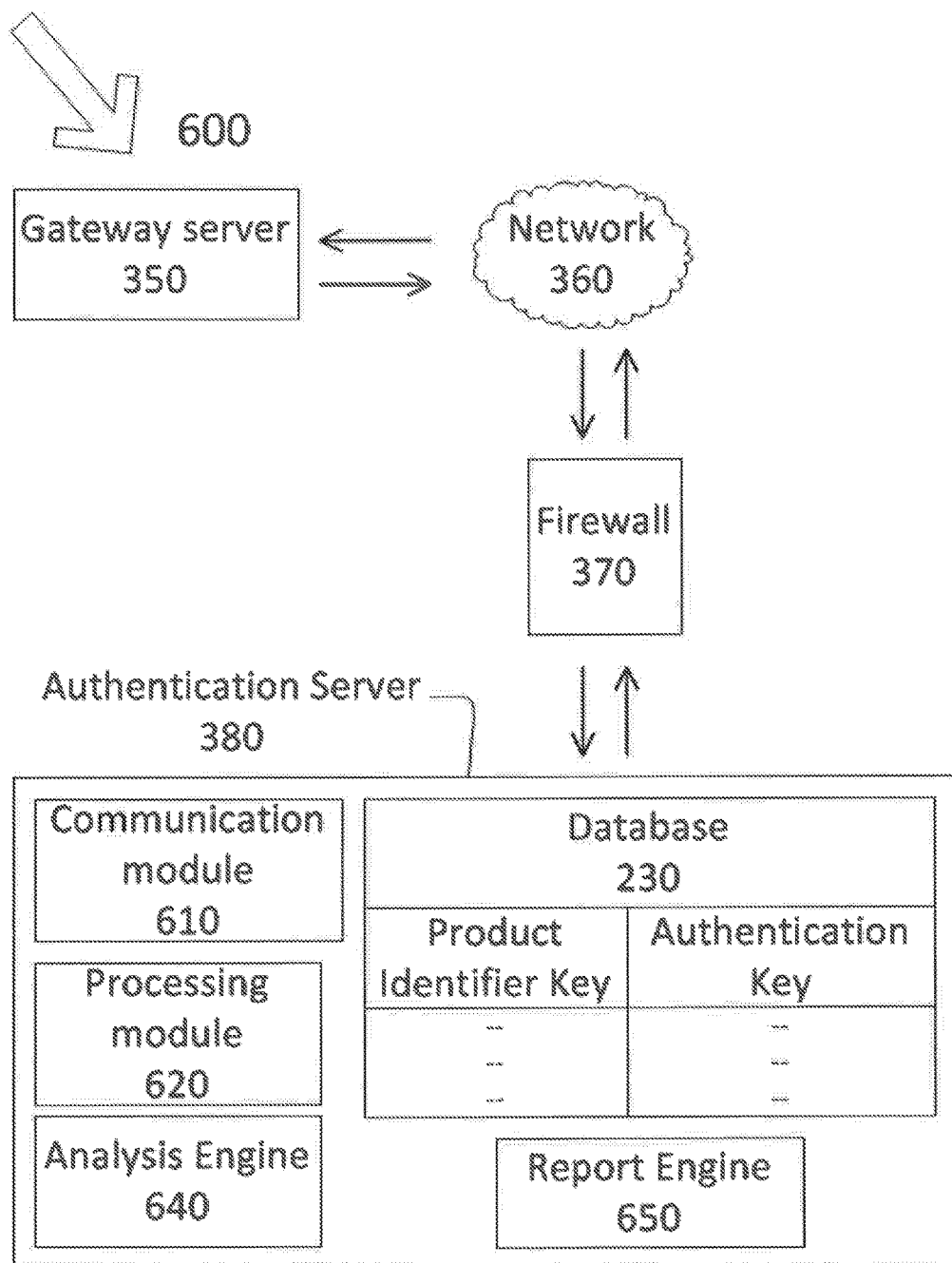
FIG. 6 is a more detailed view of the system of FIG. 2A.

As best shown hi the diagram 600 of FIG. 6, the authentication server 380 includes hardware and software programmed to perform certain functions in response to software instructions contained in a computer readable medium. The authentication server 380 includes a communication module 610, a processing module 620; the aforementioned database 230, an analysis engine 640, and a report engine 650. The authentication server hardware may include communication interfaces, input devices, output devices, and buses to interconnect the components of the authentication server, such as processors, microprocessors, RAMS, dynamic storage devices, ROMs, and other storage devices. The communication module 610 sends and receives information to/from the gateway server 350. The received information from the gateway server 350 may contain an address location in the database 230 and the authentication key 170 associated with that address location. The processing module 620 processes instructions related to the operation of the authentication server 380, and retrieves the stored authentication key 170 in the database 230 at the address identified by the captured information from the gateway server 350, and compares the stored reference authentication key 170 in the database 230 with the authentication key information sent by the website 100 as received through the gateway server 350. The database 230 also stores key product attributes/characteristics 130 corresponding to a given product identifier key 165 in addition to the authentication key 170. The authentication site 380 may also request the product attributes 130 displayed at the website 100 through the buyer 205, or can retrieve this information directly from the website 100. If authentication information from the website 100 matches all attributes of the stored reference key corresponding to the address location and the product attributes 130, then the processing module 620 sends an output to the device of the consumer 205 and the website 100 via the gateway server 350 with a message such as "product is authentic", or a similar message.

The analysis engine 640 analyzes the products of the brand owner to determine which products are being counterfeited/diverted/overrun/stolen most and sold on the website 100 and in which geographic locations, based on the website location. The analysis engine 640 collects such information as to which products from which website were authentic and which were not, and which website had the problems, if any. The analysis engine 640 also conducts data mining based on hardware or software logic, and as requested by the brand owner.

The report engine 650 creates reports for each brand owner in the format specified by the brand owner based on the analysis by the analysis engine 640 and communicates these reports through communication module 610 to the gateway server 350, and finally to the brand owner.

Figure 7:
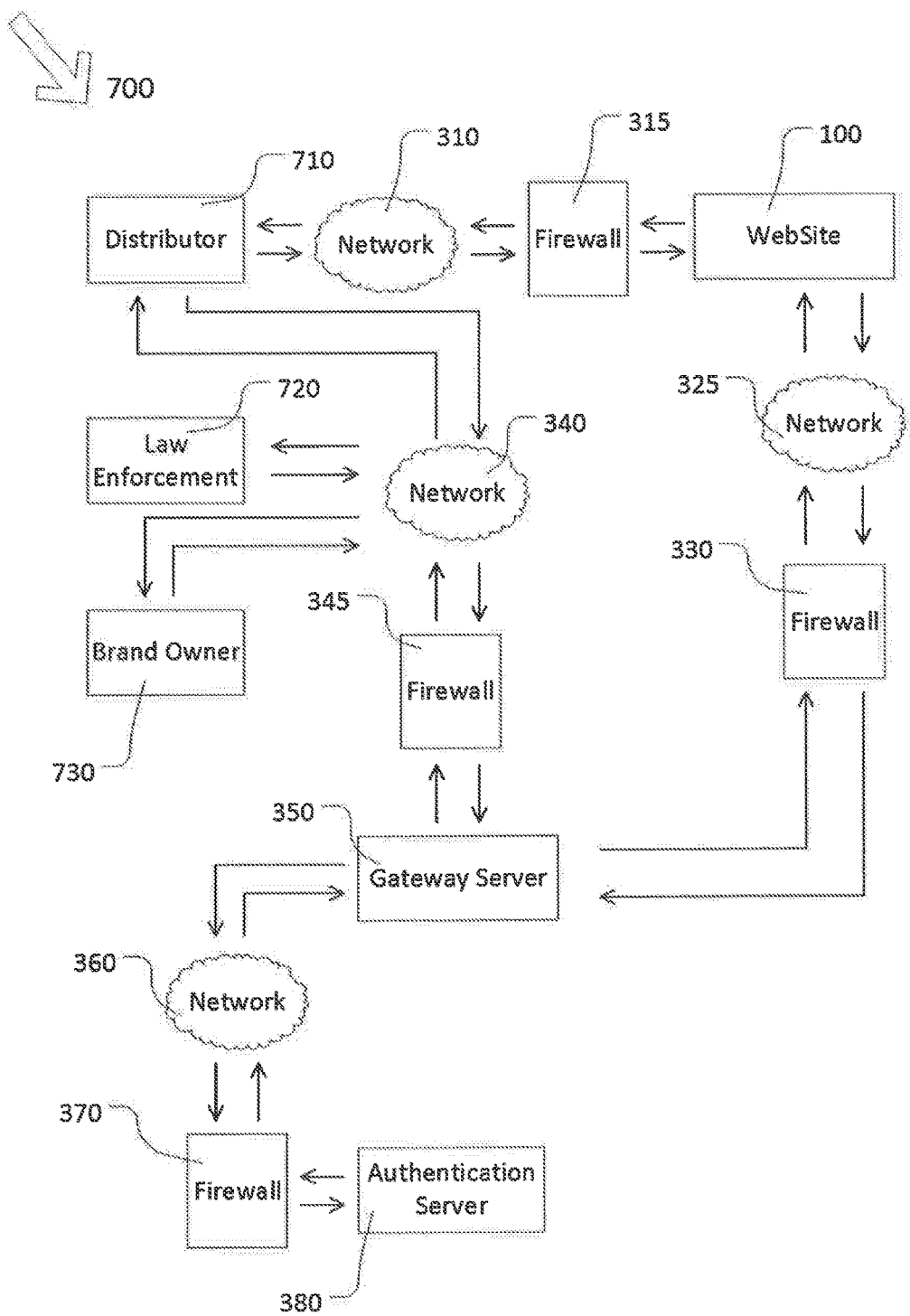
FIG. 7 is a diagrammatic view of another embodiment of the system for preventing unauthorized products from being sold on online sites.

As best illustrated by diagram 700 in FIG. 7, the gateway server 350 may communicate with a brand owner 730, law enforcement and detective agencies 720, and distributors 710 of the product. Detective agencies may be deployed by the brand owner to identify fraudulent websites. However, detective agencies and brand owners till now have no tools to track and authenticate an article of commerce's authenticity that is being sold on various online sites 100. Detective agencies and brand owners in the past could have ordered samples from various websites and conducted an offsite investigation. However, this type of investigation is not in real time and is of limited value to securitize a brand. If the website is indeed an honest website and is trying to sell genuine branded products, they may contact the distributor 710 if any of the products on their website as received from a particular distributor is found to be non-authentic. Similarly, a distributor may be contacted by the gateway server 350, or the brand owner, if it is determined that a particular product supplied by a distributor is suspected to be an unauthorized article.

Figure 8:
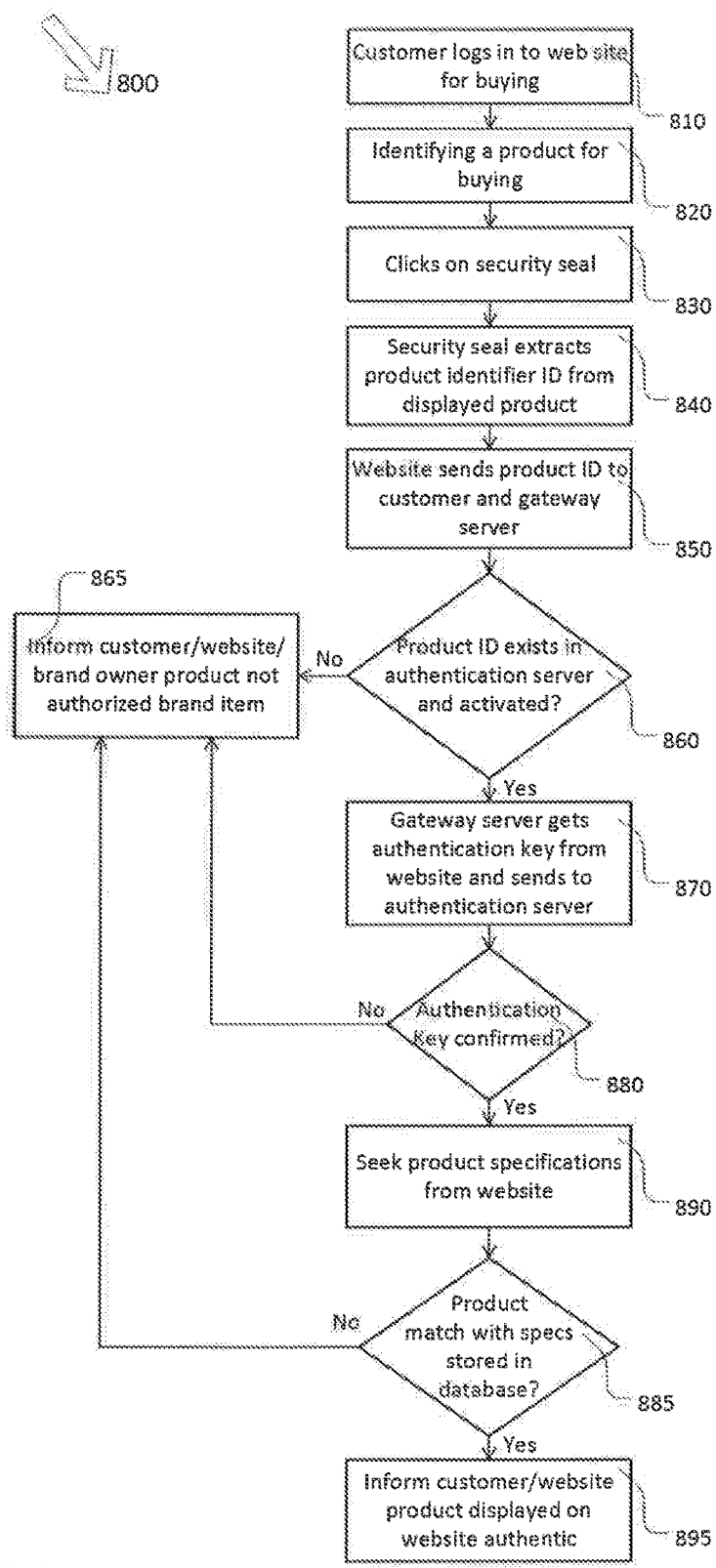
FIG. 8 is a flow chart of a method of preventing unauthorized products from being sold on online sites.

As shown by diagram 800 in FIG. 8, the buyer or customer logs in at step 810 and selects a product from a website 100 that he/she is considering buying at step 820. This product shows a particular brand and describes key attributes 130 of the product. Also shown on the website is a security seal 150 for authentication. The presence of such a seal 150 on the website 100 means that the website has agreed to an arrangement with the brand owner whose product is being displayed that an authentication server 380 at an authentication site 230 who provides an authentication service can check the authenticity of the article and can communicate such information to the buyer. The buyer selects, i.e., clicks on, the security seal 150 in step 830. The product identifier key 165 is automatically extracted from the security seal 150 by the website server in step 840, and this key 165 is sent by the website server to the buyer and the gateway sever 350 in step 850. This is to let the buyer know that the product, as identified by the product identifier key 165, is being checked for authenticity. Alternately, the buyer may get both the product identifier key 165 and the authentication key 170 related to a product.

The gateway server 350 communicates with the authentication server 380 and sends the product identifier key 165 to the authentication server 380. On receiving this information, the authentication server 380 checks to see whether a product with such a product identifier key 165 was ever manufactured by the brand owner, or manufactured for the brand owner by a third party, and was activated in the database at step 860. Only activated products will be in the authentication database 230. If the website 100 is displaying a product with the wrong product identifier key 165, then the authentication server 380 will send this information to the gateway server 350, and the gateway server 350 will inform the buyer/website/brand owner that the product displayed on the website is not an authorized branded product at step 865.

If the product was activated and is registered in the authentication database 230, then the website server extracts the authentication key 170 for the product under consideration and sends this information to the gateway server 350, which then forwards the product identifier key 165 and the authentication key 170 to the authentication server 380 at step 870. The database 230 of the authentication server 380 has pre-stored the product identifier keys 1 . . . n and the associated authentication keys 1 . . . n that were affixed or assigned to products under the control and direction of the brand owner.

The extracted data consisting of the product identifier key 165 and the authentication key 170 coming from the gateway server 350 is compared with the stored authentication key at the corresponding address at step 880. If the authentication key 170 is confirmed, then the authentication server 380 prompts and requests the product attributes/characteristics 130 from the buyer 205, or the website server, and compares them to the pre-stored product attributes 130 in the database 230 at the corresponding product identifier address at step 891. If there is no match, the product is fake, and this information is communicated to the buyer/website/brand owner at step 865. If there is a match, this information is sent to the buyer/website/brand owner at step 895.

In this disclosure, every individual or machine or entity that tracks an article before buying it online from a website 100 becomes a quality inspector and whenever a non-authentic article is detected on any website, this information is communicated to the brand owner, to detective agencies, and to the consumer or entity who is interested in buying the product from the website. Alternatively, statistical control charts and other analytical instruments can be created to detect fraudulent websites where instances of non-authentic products are being advertised for sale.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of determining that a product being sold to a consumer at an online website is authentic using an authentication database, where each authentic product has an identifier key and a corresponding authentication key, and the database stores an identifier key and a corresponding authentication key for each authentic product, the method comprising:

receiving, by a gateway server, a product identifier key for a product from an online website;

sending, by the gateway server, the product identifier key to an authentication server;

verifying, by the authentication server, the product identifier key by matching the product identifier key to an identifier key stored in the authentication database;

determining, by the gateway server, that the product identifier key is verified, and based on the verification, requesting from the online website an authentication key;

receiving, by the gateway server, the authentication key from the online website;

transmitting, by the gateway server, the authentication key and the product identifier key to the authentication server;

determining, by the authentication server, that the product is authentic by looking up the corresponding authentication key in the database using the product identifier key, and determining that the corresponding authentication key matches the transmitted authentication key;

communicating that the product is authentic, by the authentication server, to the gateway server; and communicating that the product is authentic, by the gateway server, to the online website and to the consumer.

2. The method of claim 1, further comprising a prior to receiving the product identifier key, receiving, by the gateway server, a selection of a security seal icon from the consumer.

3. A system of determining that a product being sold to a consumer at an online website is authentic using an authentication database, where each authentic product has an identifier key and a corresponding authentication key, and the database stores an identifier key and a corresponding authentication key for each authentic product, the system comprising:

a gateway server, the gateway server comprising:
a gateway server processor; and a gateway server memory that stores first computer readable instructions that when executed by the gateway server processor cause the gateway server processor to perform the operations of:

receiving a product identifier key for a product from an online website;

sending the product identifier key to an authentication server;

receiving, from the authentication server, a response;

based on the response, determining that the product identifier key is verified and based on the verification, requesting from the online website an authentication key;

receiving the authentication key from the online website;

transmitting the authentication key and the product identifier key to the authentication server;

receiving a communication from the authentication server indicating that the product is authentic;

communicating that the product is authentic to the online website and to the consumer;

an authentication server, the authentication server comprising:

an authentication server processor; and a authentication server memory that stores second computer readable instructions that when executed by the authentication server processor cause the authentication server processor to perform the operations of:

receiving the product identifier key from the gateway server;

verifying the product identifier key by matching the product identifier key to an identifier key stored in the authentication database;

based on the verifying, sending the response to the gateway server;

receiving the authentication key and the product identifier key from the gateway server;

determining that the product is authentic by looking UP the corresponding authentication key in the database using the product identifier key and determine that the corresponding authenticating key matches the transmitted authentication key; and, communicating that the product is authentic to the gateway server.

4. The system of claim 3, wherein the first instructions, when executed by the gateway server processor, cause the gateway server processor to perform the operation of: prior to receiving the product identifier key, receiving, by the gateway server processor, a selection of a security seal icon from the consumer.

* * * * *